United States Patent
Hudgins et al.

(10) Patent No.: US 7,856,185 B2
(45) Date of Patent: *Dec. 21, 2010

(54) WIRELESS MONITORING OF OPTOELECTRONIC MODULES AND NETWORK COMPONENTS

(75) Inventors: Clay E. Hudgins, Edgewood, NM (US); Daniel McGlynn, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 760 days.

This patent is subject to a terminal disclaimer.

(21) Appl. No.: 11/712,725

(22) Filed: Mar. 1, 2007

(65) Prior Publication Data

US 2008/0031620 A1 Feb. 7, 2008

Related U.S. Application Data

(63) Continuation-in-part of application No. 11/499,120, filed on Aug. 4, 2006, now abandoned, and a continuation-in-part of application No. 11/620,317, filed on Jan. 5, 2007.

(51) Int. Cl.
H04B 10/00 (2006.01)

(52) U.S. Cl. .................. 398/135; 398/136; 398/164; 398/108; 398/107; 398/117; 398/115; 398/33; 398/22; 398/23; 398/24; 398/25; 398/9; 385/88; 385/90; 385/92; 385/93

(58) Field of Classification Search .................. 398/135, 398/136, 137, 138, 139, 128, 130, 115, 116, 398/117, 118, 119, 33, 22, 23, 24, 9, 10, 398/17, 182, 183, 202, 208, 209, 195, 196, 398/197, 200, 214, 58, 66, 68, 72, 164, 108, 398/107, 106; 385/88, 89, 90, 92, 93

See application file for complete search history.

(56) References Cited

U.S. PATENT DOCUMENTS

| | | | |
|---|---|---|---|
| 6,240,312 B1 | 5/2001 | Alfano et al. | |
| 6,912,361 B2 | 6/2005 | Aronson et al. | |
| 6,917,288 B2 | 7/2005 | Kimmel et al. | |
| 6,941,077 B2 | 9/2005 | Aronson et al. | |
| 6,952,531 B2 | 10/2005 | Aronson et al. | |
| 6,957,021 B2 | 10/2005 | Aronson et al. | |
| 6,990,324 B2 | 1/2006 | Laroia et al. | |
| 7,050,720 B2 | 5/2006 | Aronson et al. | |
| 7,058,310 B2 | 6/2006 | Aronson et al. | |
| 7,079,775 B2 | 7/2006 | Aronson et al. | |
| 7,149,430 B2 | 12/2006 | Hosking et al. | |
| 7,162,160 B2 | 1/2007 | Aronson et al. | |
| 7,184,668 B2 | 2/2007 | Aronson et al. | |
| 7,200,337 B2 | 4/2007 | Hosking et al. | |
| 7,226,220 B2 * | 6/2007 | Choy et al. | 385/92 |

(Continued)

Primary Examiner—Hanh Phan (57) ABSTRACT

An optoelectronic module for converting and coupling an information-containing electrical signal with an optical fiber including a housing having an electrical input for coupling with an external cable or information system device and for transmitting and receiving information-containing electrical signals over such input, and a fiber optic connector adapted for coupling with an external optical fiber for transmitting and receiving an optical signal; an electro-optic subassembly coupled to the information containing electrical signal and converting it to and/or from a modulated optical signal corresponding to the electrical signal; parametric data-collection means disposed in the housing acquiring environmental and/or operational data associated with the module; and a communication interface for wirelessly transferring the data to an external device, such as a portable terminal.

16 Claims, 7 Drawing Sheets

U.S. PATENT DOCUMENTS

| | | |
|---|---|---|
| 7,302,186 B2 | 11/2007 | Light et al. |
| 7,346,278 B2 | 3/2008 | Aronson et al. |
| 7,623,784 B1 * | 11/2009 | Pan et al. ................ 398/58 |
| 2003/0053170 A1 * | 3/2003 | Levinson et al. .......... 359/152 |
| 2003/0128411 A1 | 7/2003 | Aronson et al. |
| 2004/0136708 A1 | 7/2004 | Woolf et al. |
| 2004/0197101 A1 | 10/2004 | Sasser et al. |
| 2005/0196111 A1 | 9/2005 | Burdick et al. |
| 2006/0045525 A1 | 3/2006 | Lee et al. |
| 2007/0092257 A1 * | 4/2007 | Smith et al. .............. 398/135 |
| 2007/0140690 A1 | 6/2007 | Aronson et al. |
| 2007/0263713 A1 | 11/2007 | Aronson |
| 2008/0166131 A1 * | 7/2008 | Hudgins et al. ........... 398/117 |
| 2008/0298810 A1 * | 12/2008 | Crosby et al. ............. 398/135 |
| 2009/0119686 A1 | 5/2009 | Monroe |
| 2009/0180775 A1 * | 7/2009 | Hudgins et al. ............ 398/25 |

\* cited by examiner

WIRELESS MONITORING OF OPTOELECTRONIC MODULES AND NETWORK COMPONENTS

REFERENCE TO RELATED APPLICATIONS

This application is a continuation in part of U.S. patent application Ser. No. 11/499,120 filed Aug. 4, 2006 now abandoned, and U.S. patent application Ser. No. 11/620,317 filed Jan. 5, 2007, both assigned to the common assignee.

BACKGROUND OF THE INVENTION

1. Field of the Invention

The invention relates to optical communications devices, such as transmitters, receivers, and transceivers used in high throughput fiber optic communications links in local and wide area networks and storage networks, and in particular to the identification of such devices, and the monitoring of the performance of such devices by wireless communication of real time and stored data to a portable terminal.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal, and similar implementations employ one fiber for both optical signals, traveling in opposite directions. The electrical signals are transferred in both directions over an electrical connectors that interface with the network unit using a standard electrical data link protocol.

The optical transmitter section of such transceiver modules includes one or more semiconductor lasers and an optical assembly to focus or direct the light from the lasers into an optical fiber, which in turn, is connected to a receptacle or connector on the transceiver to allow an external optical fiber to be connected thereto using a standard connector, such as SC, FC or LC. The semiconductor lasers are typically packaged in a hermetically sealed can or similar housing in order to protect the laser from humidity or other harsh environmental conditions. The semiconductor laser chip is typically a distributed feedback (DFB) laser with dimensions a few hundred microns to a couple of millimeters wide and 100-500 microns thick. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which in turn, is connected to a transimpedance amplifier/limiter circuit on a circuit board. The photodetector or photodiode it typically packaged in a hermetically sealed package in order to protect it from harsh environmental conditions. The photodiodes are semiconductor chips that are typically a few hundred microns to a couple of millimeters wide and 100 to 500 microns thick. The package in which they are mounted is typically from three to six millimeters in diameter, and two to five millimeters tall and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), XFP ("10 Gigabit Small Form Factor Pluggable", see www.XFPM-SA.org), and the 300-pin module (see www.300pinmsa.org).

Customers and users of such modules are interested in small or miniaturized transceivers in order to increase the number of interconnections or port density associated with the network unit, such as, for example in rack mounted line cards, switch boxes, cabling patch panels, wiring closets, and computer I/O interfaces.

The identification of individual modules in connection with assessing reliability of such modules is an important consideration network management. When a module degrades or fails, users must reconfigure the system to bypass the inoperative module. Moreover, performance degradation must be understood as an essential step in preventing recurrence of that failure. Thus, producers of optical modules expend much effort in failure analysis to determine the root cause of any failures that occur and to subsequently improve products to eliminate similar failures in the future. Such failure analysis is after the fact, and very labor intensive, requiring technologists referred to as reliability analysts. Such failure analysis often requires an extensive suite of test equipment, which also represents a significant expense to the manufacturer.

The failure analysis process is relatively expensive to the manufacturer, and consequently the producer has an interest in conducting the analysis as efficiently as possible such as when the module is still installed in the system. Additionally, sometimes the failure is covered by a warranty, and honoring the warranty represents an expense to the manufacturer.

If more information regarding the operational history of the optical module could be made available during a real time basis, then determining the warranty status would be made more straightforward, and aspects of the failure analysis would be simpler. Failure analysis involves a search for information about the causes and circumstances of product failure, often by exploiting very subtle clues, and any information that can be made explicitly available to the reliability analyst has the potential to make their task more productive, effective, and efficient.

This concept of module data analysis is extendable to cases in which no failure has occurred. In this case, a reliability analyst may analyze a used optical module to observe parametric shifts in performance, and the information gained may be used to define design and manufacturing process improvements to make the product even more reliable in the future. Because of the importance of reducing failures and parametric shifts in product performance, a need exists for better methods of tracking operational performance of optical modules by users and vendor maintenance personnel.

The use of radio frequency identification (RFID) tags is well known in industry for article identification, location, tracking, and inventory management. The use of personal and local area networks for wireless communication with devices is also known.

Identification information, such as transceiver type, capability, serial number, compatibility information may be stored, or be capable of being stored, in a transceiver (see, for example, U.S. Patent Application Publication 2003/0128411). Prior to the present invention such information has not been readily accessible, or capable of being monitored by a portable or mobile terminal for assessing the status and reliability of such modules during real time operation.

SUMMARY OF THE INVENTION

Objects of the Invention

It is an object of the present invention to provide an optoelectronic module in a small pluggable standardized form factor with embedded identification and parametric data monitoring and collection devices in the module, and a wireless communications interface.

It is also another object of the present invention to provide a module for use in an optical fiber transmission system with means for collecting total elapsed operating time, temperature, temperature change, and data transmission error rate, and wirelessly externally communicating such data to a portable terminal.

It is still another object of the present invention to provide an optical transceiver with a means for collecting and transmitting environmental and operational data at periodic time intervals wirelessly to an external network manager.

It is still another object of the present invention to provide an RFID tag in an optoelectronic module for transmitting alerts of excursions from normal environmental and operational conditions to an external network manager.

It is another object of the present invention to provide an optical transceiver for use in an optical transmission system with an RF beacon to externally communicate the existence of abnormal operating conditions.

It is still another object of the present invention to provide an optoelectronic module in a small pluggable standardized form factor with wirelessly communicable embedded identification and authorization data.

It is also another object of the present invention to provide a module for use in an optical fiber transmission system with means for authenticating the module when plugged into a host unit connected to a network.

It is still another object of the present invention to provide an optical transceiver with a means for communicating with a network manager when plugged into a host unit for verifying and authorizing use of such module.

It is still another object of the present invention to provide a feature in a network operating system receiving alerts of excursions from normal environmental and operational conditions from pluggable transceiver modules.

It is also another object of the present invention to provide an optical transceiver for use in an optical transmission system with tamper proof identification devices and to wirelessly externally communicate the identity and existence of such module to a network manager and to report abnormal operating conditions.

FEATURES OF THE INVENTION

Briefly, and in general terms, the present invention provides an optoelectronic module for coupling an information system device with an optical fiber comprising: a housing including an electrical connector for coupling with an external electrical cable or information system device and for transmitting information-containing electrical signals over such connector, and a fiber optical connector adapted for coupling with an external optic fiber for transmitting an optical signal; an electro-optic subassembly disposed in the housing coupled to the cable or information system device for converting the electrical signal to a modulated optical signal at a predetermined wavelength corresponding to the electrical signals; a means disposed in the housing for providing an electrical signal representing operational data associated with the module; and a communication interface means disposed in the housing for wirelessly transferring the operational data to an external device.

In another aspect, the present invention provides an optical transceiver for converting and coupling an information-containing electrical signal from an information system device with an optical fiber including a housing including an electrical connector for coupling with an external electrical cable or information system device and a fiber optic connector adapted for coupling with an external optical fiber, at least one electro-optical subassembly in the housing for converting between an information containing electrical signal and a modulated optical signal corresponding to the electrical signal including either a transmitter or a receiver, or both; parametric collection means in the housing for collecting operational data associated with the transmitter; data compression means in the housing for compressing the operational data; and means disposed in said housing for wirelessly transferring said data to an external device.

Some implementations or embodiments may achieve fewer than all of the foregoing objects.

In another aspect, the present invention provides a data communication network including a plurality of network units and a plurality of pluggable optoelectronic modules coupled to one or more of such network units, the modules functioning to couple the associated network unit to an optical fiber for transmitting and/or receiving optical signals over such fiber, each module having a unique electronic identifier that is selectable from a set of identifiers, and means for wirelessly transmitting the identifier to an external device.

Additional objects, advantages, and novel features of the present invention will become apparent to those skilled in the art form this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Some implementations or embodiments may incorporate or implement fewer of the aspects or features noted in the foregoing summaries.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to the identification and parametric environmental and operational data monitoring of pluggable optical communications modules such as transmitters, receivers, and transceivers used in fiber optic communications systems.

Figure 1:
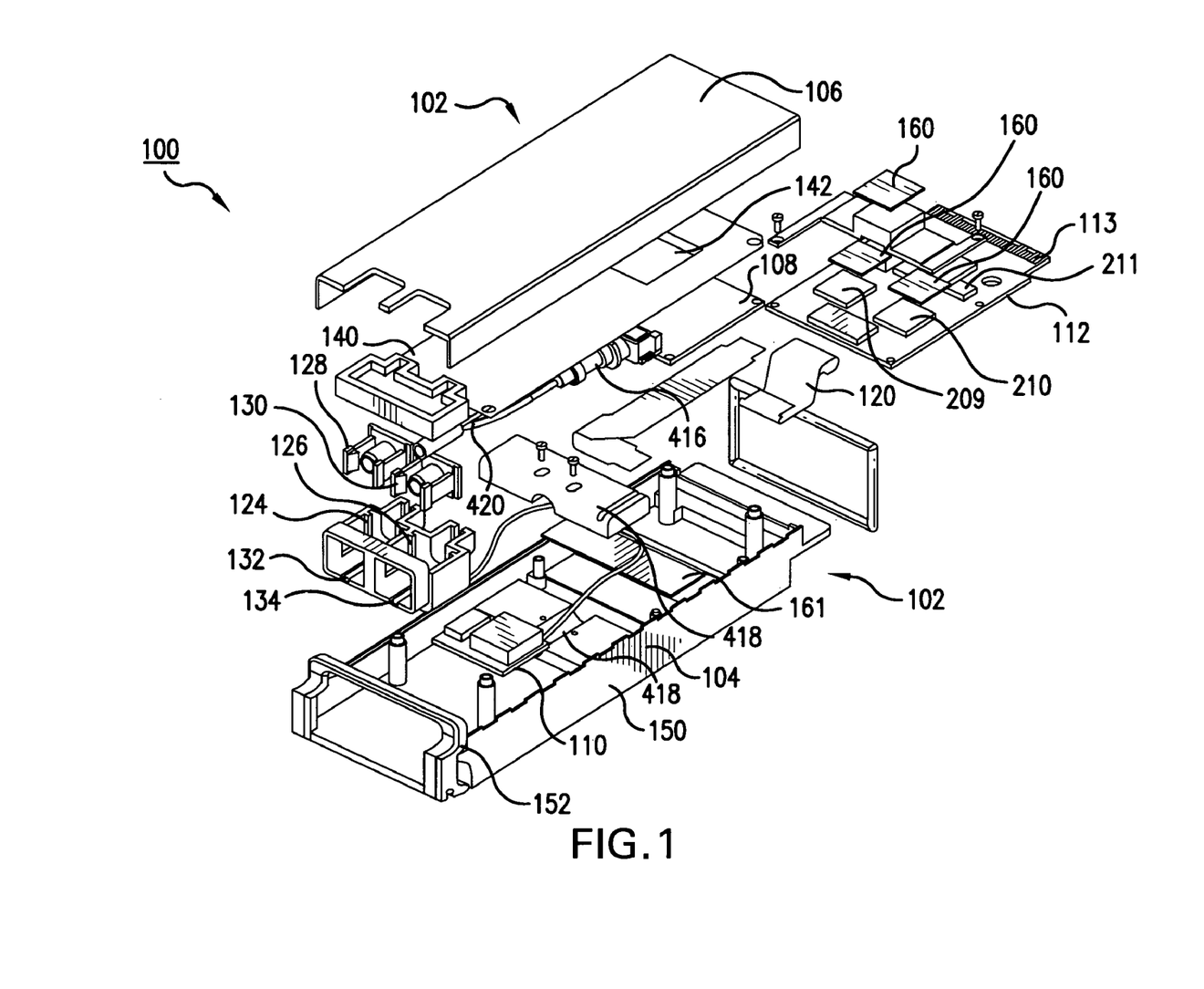
FIG. 1 is an exploded perspective view of an optoelectronic module in accordance with an illustrated embodiment of the invention.

Referring now to FIG. 1, there is shown an exploded view of an exemplary pluggable optical transceiver module 100 according to a preferred embodiment of the present invention. In this particular embodiment, the module 100 is compliant with the IEEE 802.3ae 10GBASE-LX4 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured in various alternate form factors such as XENPAK, X2, etc. The module 100 is preferably a 10 Gigabit Wide Wavelength Division Multiplexed (WWDM) transceiver having four 3.125 Gbps distributed feedback lasers that enable 300 meter transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes four distributed feedback (DFB) semiconductor lasers, which may be mounted in a single, hermetically sealed enclosure 415, which interfaces to a fiber coupling subassembly 416. The transmit board 108 is secured in place at the bottom of the housing using a brace 418 attached to the coupling subassembly 416. The brace also functions as a heat sink for dissipating heat from the metallic fiber coupling subassembly 416 and hermetically sealed enclosure 415. In addition, the transmit board 108 and receive board 110 are connected to the PCS/PMA board 112 by respective flex interconnects 121 and 120, or other board-to-board electrical connectors or cables. Thermally conductive gap pads may be provided to transmit the heat generated by the lasers or other components in the transmitter subassembly to the base 104 or cover 106 of the housing, both of which act as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as Flex-Plane™ available from Molex, Inc. of Lisle, Ill., although other flexible substrate may be used as well. The optical fiber 420 originating from the transmitter subassembly is thereby routed to the transmit optical connector plug 130, which is attached to the faceplate 131, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the cover 106 which acts as a heat sink, to contact a heat transmission gap pad 160, so as to provide access and a heat conductive path to the mounted components on the board 112. This area on the board 112 normally would be inaccessible if not for the opening 142. The gap pad 160 is installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment, the transceiver 100 is manufactured in a modular manner using three separate subassemblies mounted in the housing—a transmitter subassembly, a receiver subassembly, and a protocol processing board—with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside the housing.

The modern optical transceiver or module, such as that of FIG. 1, as well as those complying with the XENPAK, X2, XPAK, or 300 pin form factors, possesses underutilized resources for collecting information and nonvolatile memory in which to store it. Optical modules 100 typically employ synchronous digital circuitry, which gives them the capability to measure Elapsed Run Time (ERT) in an Elapsed Run Time Meter (ERTM) as has long been done in the field of industrial-grade internal combustion engines. The present invention implements an ERTM in a digital logic circuit 209 or other means within the housing of the module 100 for recording and storing the total operating time of the optical module without a microprocessor or alternately may implement the ERTM using a clock-counter resource within an embedded microprocessor 210, depending on the hardware resources available within the optical module.

The purpose of the ERTM within the module 100 is to count and to store the number of time units the module has run since first being built and provided to the user, and to make that information available to the producer if the user should ever return the module to the producer for warranty service, or for any other reason. For the ERTM to be useful to the producer's reliability analyst, the ERTM must by default retain the ERT value in nonvolatile memory when power is removed from the optical module. Furthermore, the ERTM must by default continue counting ERT when power is once again applied to the optical module, resuming with the previous value rather than starting over from zero. In addition to the default behaviors of the ERTM, which enable autonomous operation without intervention by the user, the producer must have a means to override default ERTM behaviors for maintenance and diagnostic purposes, including the ability to reset the ERTM to zero, to read the ERTM's value, to set the ERTM to non-zero values, and to freeze (i.e., halt or stop) and restart the ERTM.

The ERTM's demands on nonvolatile storage space within the module 100 are quite modest. For example, a one-minute resolution meter with thirty years duration may be implemented in only 24 bits of nonvolatile memory (i.e., 30 years× 365.25 days/year×24 hours/day×60 minutes/hour=15,778, 800 minutes. It may be noted that 15,778,800 minutes is less than the maximum value of a 24 bit register, which may represent a maximum of $2^{24}-1$, which equals 16,777,215).

In practice, the ERTM is not constrained to measure time in conventional time units (e.g., hours, minutes, seconds). The ERTM may measure elapsed time in some local timebase, which may be a convenient multiple of the period of any synchronous digital clock employed within the optical module or some multiple of the signaling period of data passing through the module. (Often optical modules recover a digital clock signal from the received pseudorandom optical data waveform.) The necessary general purpose processing to convert the ERTM's timebase to conventional time units need not be present within the optical module, since general purpose processing capability will be conveniently available to the producer's reliability analyst.

Typically, when a user decides that a module has failed, such conclusion is one from the user's viewpoint, and thus the failure will be related to some parameter of direct interest to the user, and that failure will likely not involve the ERTM, which is of only indirect interest to the user. When the user removes the optical module from operation, by unplugging it from the host unit, the optical module will no longer receive the electrical power required to operate, and so the ERTM will cease to run. And so, when the producer receives a failed module returned by the user, the ERTM will provide the total elapsed run time experienced by the module up to the point of failure, which is something that otherwise would impossible to know and difficult to estimate.

Another feature of the present invention is the data compression of data acquired in the module 100. A data compression algorithm may be implemented in software and executed on the microprocessor 210. Run length encoding is a preferred data compression technique for environmental data such as temperature which may remain substantially the same value for an extended period of time. One of the lossy data compression techniques of U.S. patent application Ser. No. 11/499,120 may be employed to retain the most recent readings and less frequent samples of the older readings. A data communications interface circuit 211 may be used to assemble the compressed data into a data packet which can be periodically transferred to the host unit. The data packet may contain the serial number of the module, the time and date of the sample, the type of sample data, and the data itself.

Figure 2:
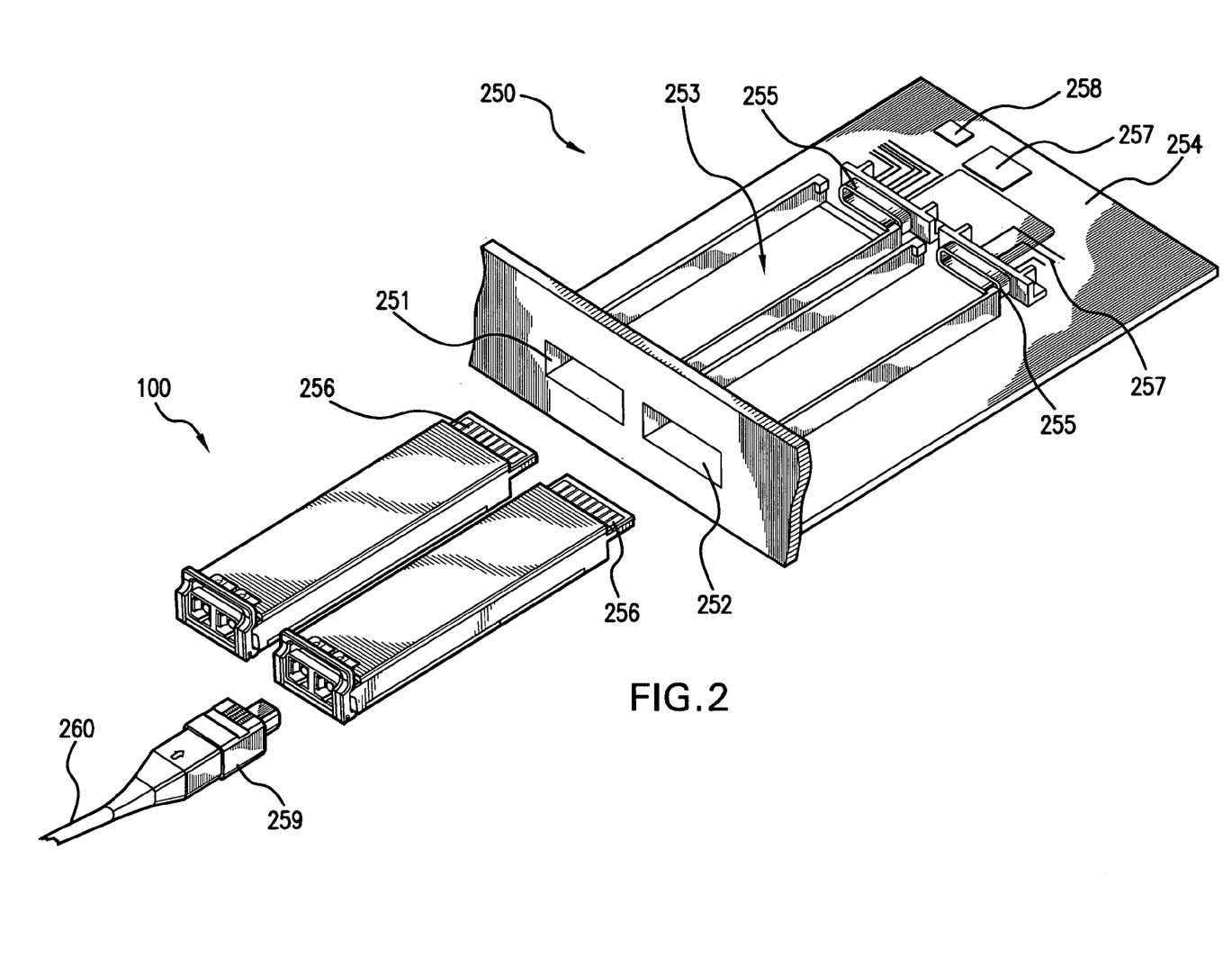
FIG. 2 is a perspective view of a module being inserted into a receptacle or cage in a host unit.

FIG. 2 is a perspective view of a module being inserted into a receptacle or cage in a host unit. The perspective view of the chassis 250 of the host unit or information system device for receiving a pluggable module according to the present invention depicts receptacles 251, 252 adapted for receiving a pluggable module 100, a cage 253 for securing the module adjacent to a printed circuit card 254, and an electrical connector 255 connected to the printed circuit card 254 and adapted for receiving the electrical connector 256 associated with the module. The printed circuit card 254 includes power and bus lines 257, a processor 258, and associated components such as memory 259. An optical cable connector 259 is employed to connect module 100 to the host optical cable plant 260.

Figure 3:
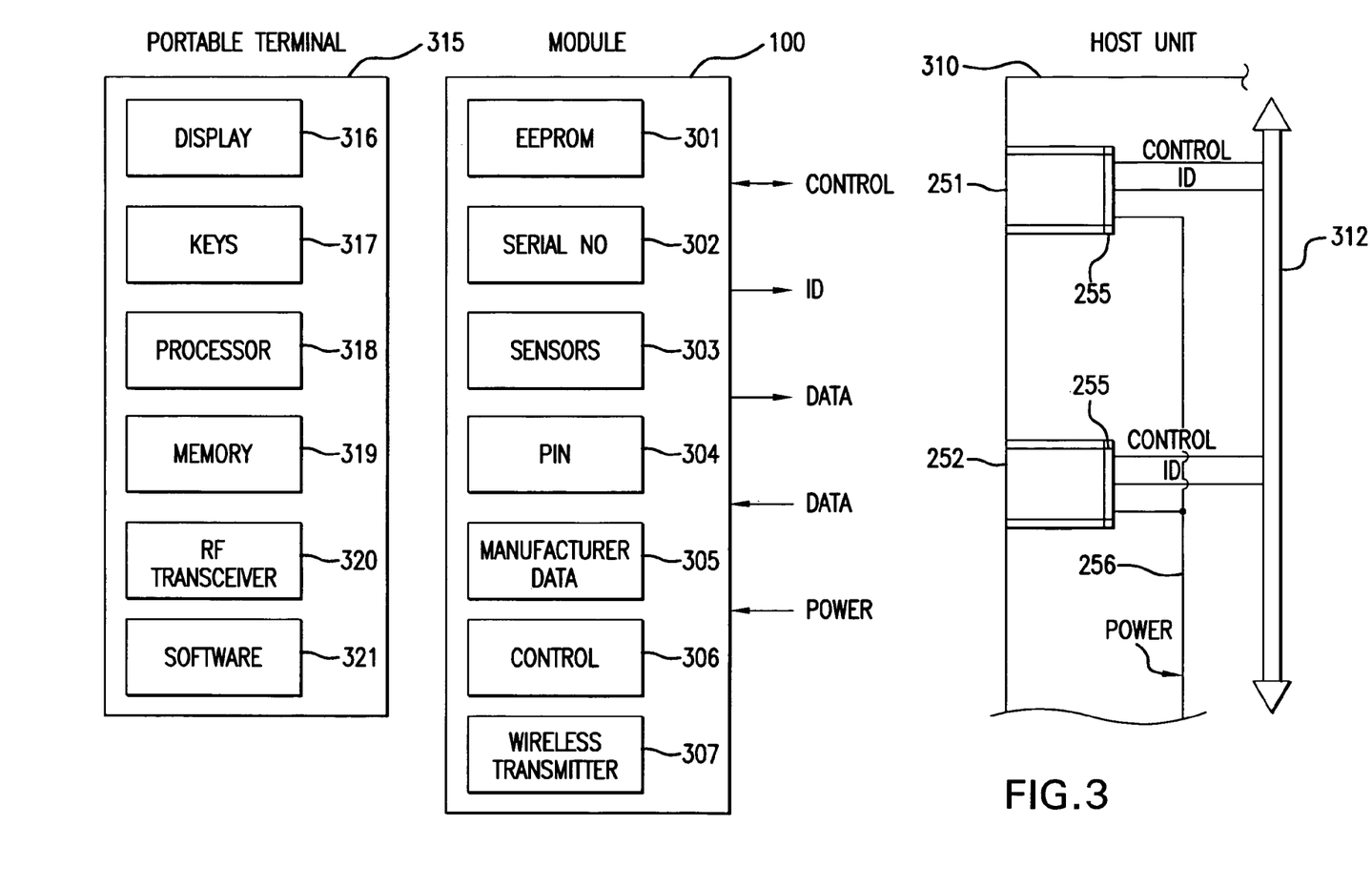
FIG. 3 is a highly simplified block diagram of certain elements of the module, the host unit, and a remote terminal.

FIG. 3 is a highly simplified block diagram of certain elements of the module 100, the host unit 310, and a portable terminal 315. In particular, the module 100 includes an EEPROM 301 for temporarily storing parametric data, a serial number ROM 302 which contains the identity of the manufacturer and the manufacturer's serial number of the module. The sensors 303 acquire the parametric data described in connection with the designation of FIG. 1. A PIN or cryptographic key 304 is also provided, which is utilized to verify the authorization of the module, or its validity, to the host unit prior to the module being capable of operation.

Various manufacturers data, such as date of manufacture, warranty period, service record, etc. may be stored in the module memory area 305. Control software 306 is provided to coordinate operation of the various stored items and controlling the communication of the stored data to the host unit 310 and the portable terminal 315. A wireless transmitter 307 provides infrared or RF communication with the portable terminal 315.

The host unit 310 is depicted as including a slot or receptacle 251, 252 for insertion of the module 100 with an electrical connector 255 in the rear of the case 253 for mating with the electrical connector 256 on the module 100. In this representation, there is also depicted a set of control and ID lines from each connector 255 connected to an internal bus 312 in the host unit 310. A power line 256 is also provided in host unit 310 which connects to each connector 255.

The portable terminal 315 may preferably include a display 316, keyboard or data entry buttons 317 (or touch screen display), a processor 318, memory 319, and an infrared or RF transceiver 320. Software 321 is also provided for a variety of operations and applications to be subsequently described.

One key aspect of the present invention is that operational data associated with the module 100 is collected in the module and transferred to a data collection unit exteriorly of the module. In the embodiment described in U.S. patent application Ser. No. 11/620,317, the data collection unit resides in the host information unit 310 to which the module is connected. In that embodiment, a communications interface is provided in the module to transfer the operational data over the input/output connector directly to the host unit. In FIG. 1, the communications IC 211 provides a communications interface.

In the embodiment of the present invention, the parametric collection means in the module transfers the data either to an active RF transmitter in the module, or a passive programmable RFID transponder in the module. In the first case, the RF transmitter broadcasts the collected data, along with module identification information. In the second case, the collected data is stored in the RFID transponder, which transfers the stored data when interrogated by an RF signal from an external data collection device.

Short-range wireless communication capability is becoming more widespread in use in a variety of different mobile devices such as portable terminals, cellular phones, personal digital assistants, pagers, MP3 players, and other mobile devices. Such devices may include short-range communication receivers or transceivers, so that the devices have the ability to communicate via RFID, Bluetooth, IEEE 803.11, IEEE 803.15, infrared or other types of short-range communication protocols dependent upon the application and type of receiver or transceiver associated with the mobile device. In one embodiment of the present invention, the portable terminal 315 may be equipped with an RF reader to interrogate and receive information from a transponder, also referred to as an RFID tag in the module 100. The portable terminal 315 may also be equipped with short-range wireless LAN communication transceivers, so as to be capable of accessing a network for further information and services.

Passive RFID tags include a small antenna tuned to the interrogating frequency, and do not include a battery or other internal power supply. A small electrical current is induced in the antenna by the incoming radio frequency signal which is coupled to a CMOS integrated circuit in the tag, which is powered up. Most passive tags signal by backscattering the carrier signal from the reader. This means the antenna has to be designed to both collect power from the incoming signal and also to transmit the outbound backscatter signal. Since a passive RFID tag may include a non-volatile EEPROM for storing parametric operational data, the return signal may include the identity of the module and the stored operational data.

There are a variety of different passive RFID tags that can be used in the present invention. The EPC RFID tags have practical read distances ranging from about 10 cm (4 in.) (ISO14443) up to a few meters (EPC and ISO 18000-6) depending on the chosen radio frequency and antenna design/size.

In addition to the components noted above, portable terminals may utilize other data entry media such as magnetic stripe cards, RFID tags, biometric sources, SIM devices, smart cards, electronic key access cards, or the like, as well as a printer for providing a display or print-out of the information transmitted and/or received by the terminal.

Figure 4:
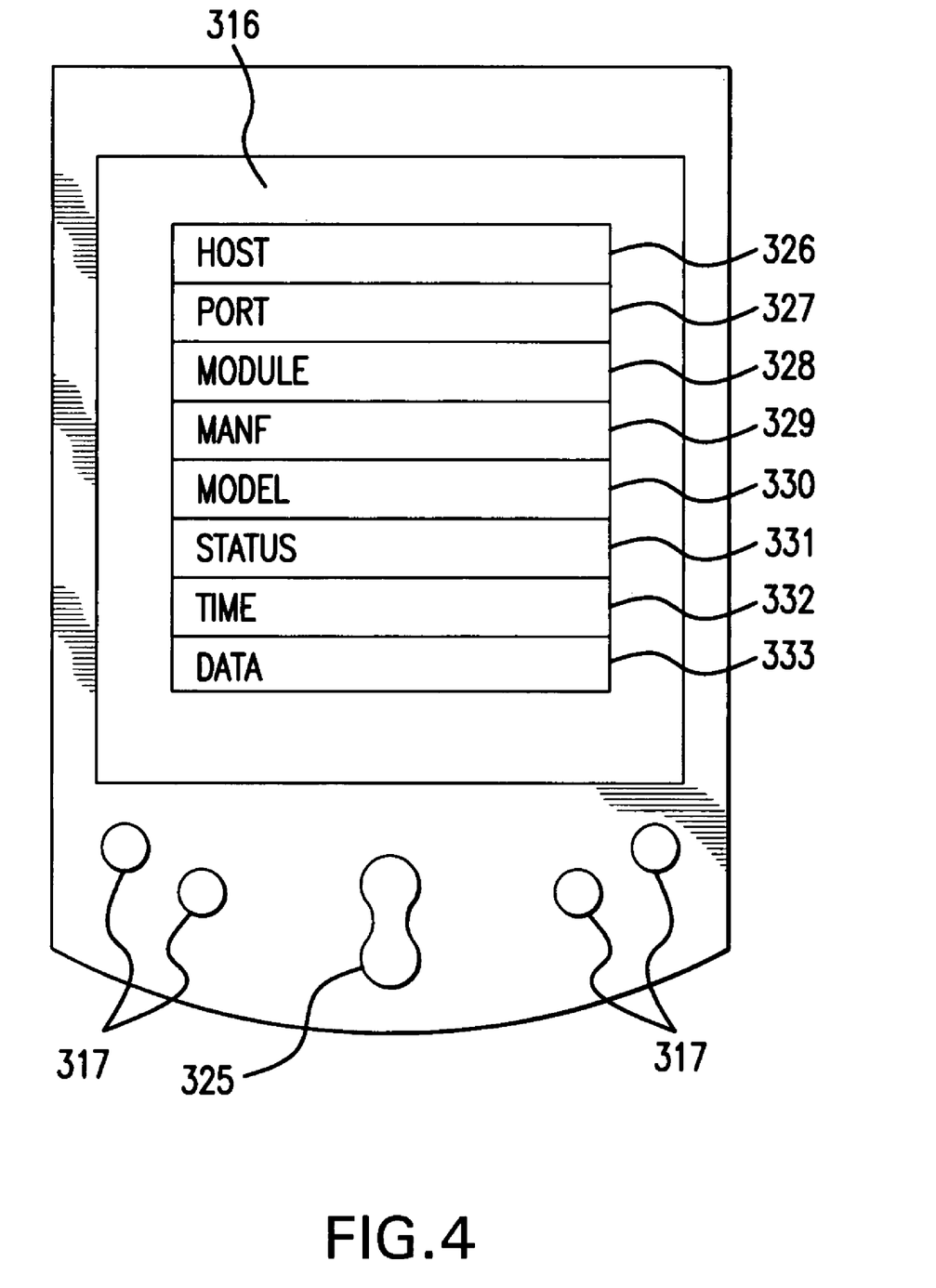
FIG. 4 is a top plan view of a portable terminal used in an embodiment of the present invention.

FIG. 4 is a top plan view of an embodiment of a portable terminal 315 with a display 316 depicting the various parameters and data that may be acquired in real time from the module by wireless transmission and displayed to the user, who in one application or example may be a maintenance technician located in the vicinity of the host units, and checking on the operational status and condition of the modules 100 associated with a host unit.

In particular, FIG. 4 depicts a variety of buttons 317, a scroll button 318, used to adjust the display. An example of the type of data that may be displayed when the portable terminal 315 is in communications range with one or more modules 100 includes identification of the host 326, identification of the port 327, identification of the module (e.g. by serial number or customer identification number) 328, identification of the manufacturer of the module 329, the model number 330, the current status of operation 324, elapsed time in use 331, and one or more other environmental or operational data fields 333.

Figure 5:
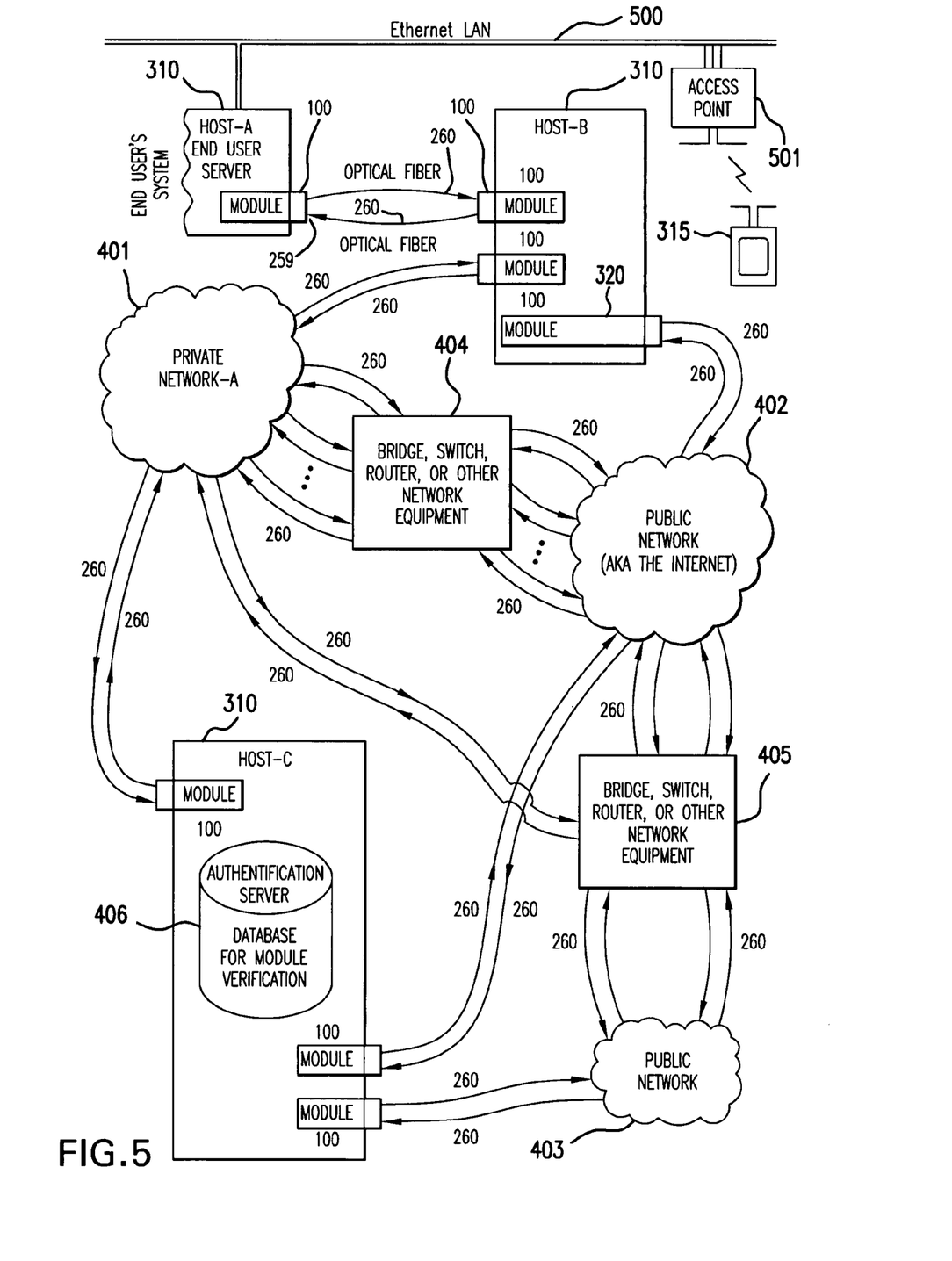
FIG. 5 is a highly simplified diagram of a computer network in which the present invention may be employed.

FIG. 5 shows a computer or data communications network as might be employed in multi-site enterprise information systems, and a possible typical configuration or interconnection between a plurality of modules 100 associated with different hosts, several hosts 310 (identified as Host-A, Host-B, and Host-C), a portable or mobile terminal 315, and an authentication server 406. In some instances, the modules 100 may be on the same private network 401 as the authentication server 406. In other cases, the modules 100 may connect directly to the public network 402, such as the Internet. An Ethernet LAN 500 is associated with Host-A 310, including an access point 501.

Similarly, the authentication server may connect to the Internet 402 or one or more private networks 401, 403. When a module 100 and authentication server are on separate private networks, these private networks may be connected directly together by network equipment (bridge, router, or switch) 405.

Alternately, when the module 100 and authentication server 406 are on separate private networks 401, 403, these private networks may first connect to the Internet 402 via network equipment 404, 405 in order to form the necessary end-to-end connectivity between the module 100 and the authentication server 406.

Moreover, a plurality of authentication servers 406 may be distributed around the network for improved fault tolerance and/or improved speed of access. In the case of a plurality of authentication servers 406, these authentication servers will periodically synchronize their databases among themselves.

Figure 6:
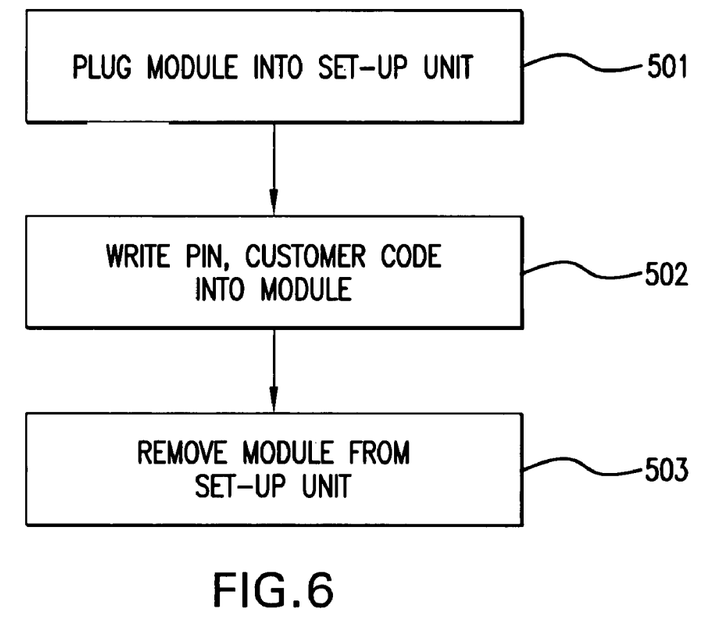
FIG. 6 is a flow chart depicting the initialization or encoding of an RFID tag in the module during manufacture.

FIG. 6 is a flow chart depicting the initialization or encoding of the module during manufacture; in particular, at step 501, the module is plugged into a test or initialization unit, powered and configured to receive identification and security data; at step 502 the PIN or cryptographic key 304 is externally generated and written into the module, after which the module is removed 503 from the programming setup unit. In addition to including information on the specific customer or class of customer equipment for which the module is authorized to be operative with, the key may cryptographically encrypt the serial number or other manufacturer's data, with a digital signature or watermark.

Figure 7:
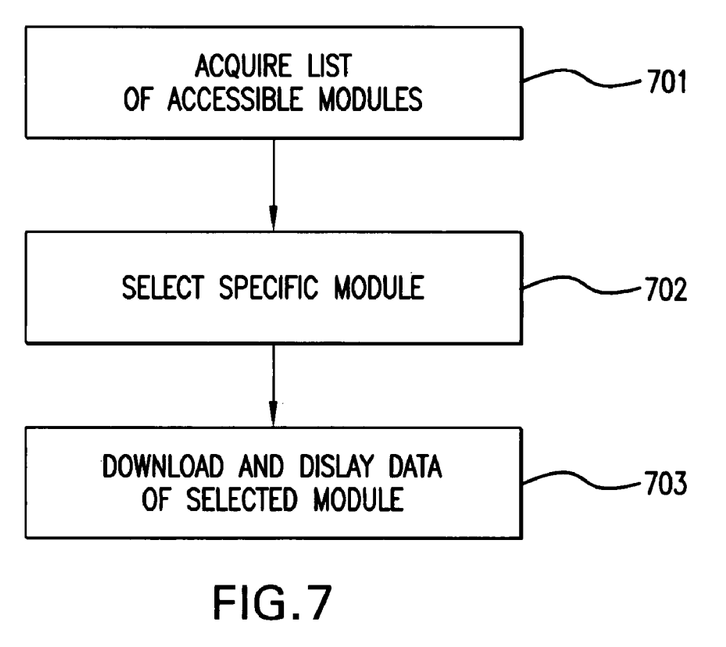
FIG. 7 is a flow chart depicting access of modules using a challenge-response protocol by a portable terminal.

FIG. 7 is a flow chart depicting the operation of the portable terminal 315 in the vicinity of one or more modules 100 in one embodiment of the present invention. As noted above, there may be several modules that are in range of the portable terminal 315, so the first task of the operation is to determine which of the modules should be analyzed. Step 701 suggests that a list of accessible modules be presented on the display 316, and the operator may then select one of the modules by identification number by activation of an appropriate key 317 at step 702. Once the module is selected, the environmental and operational data from the module is downloaded and displayed, at step 703.

Figure 8:
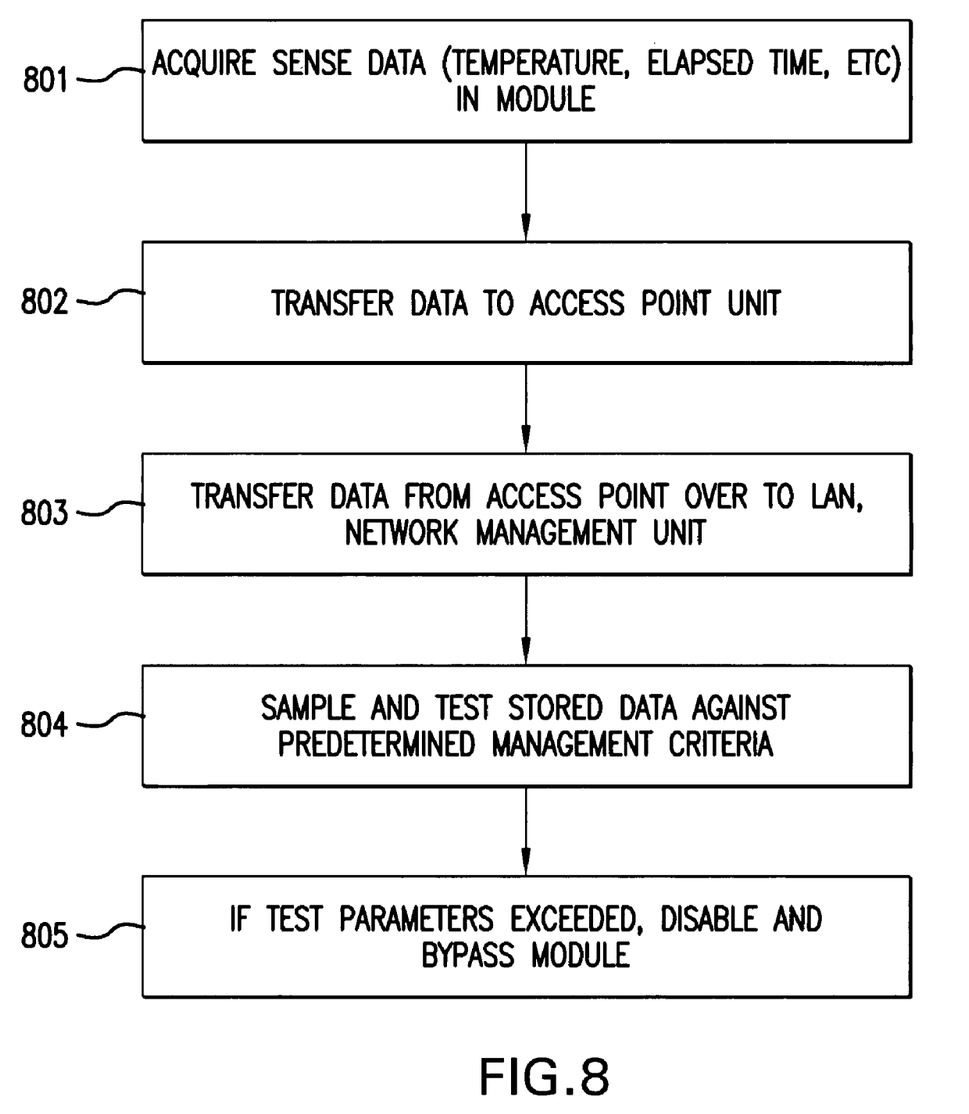
FIG. 8 is a graphical user interface depicting the acquisition of a module's operational data as part of a network management system in a portable terminal.

FIG. 8 is a flow chart which depicts another aspect of the present invention in which the identification, environmental and/or operational data in the module is wirelessly transferred to a network manager for authorization, analysis and/or corrective action.

The flow chart of FIG. 8 which describes one embodiment of the operation. At step 801, sensor data (such as temperature, elapsed time, etc.) is acquired in a module. At step 802, the acquired data is wirelessly transferred from the module to an access point, a wireless terminal connected to a wired network. Since there may be multiple host units in the network, at step 803 the data is transferred from the access point over a LAN to a host unit, and then to the network manager. Step 804 illustrates one of a variety of possible operations by the network manager on the acquired data. In this embodiment, the data is periodically sampled and compared against predetermined operational criteria. Such criteria may be used to determine if the specific module is operating within normal environmental and operational parameters, or subject to occasional stress which may affect reliability or lifetime. Step 805 illustrates an action of the network manager, in the example of the predetermined criteria being exceeded, by sending a signal to the module which results in disabling the module (such as by switching off power to the module).

Various modifications and improvements of the present invention may also be apparent to those of ordinary skill in the art. Thus, the particular combination of parts described and illustrated herein is intended to represent only certain embodiments of the present invention, and is not intended to serve as limitations of alternate devices within the spirit and scope of the invention. Various aspects of the techniques and apparatus associated with the parametric signal processing aspect of the invention may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or web site which may be downloaded to the transmitter automatically or on demand. The foregoing techniques may be performed by, for example, a single central processor, a multiprocessor, on one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions, from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specifically designed application-specific integrated circuits (ASICS).

It will be understood that each of the elements described above, or two or more together, also may find a useful application in other types of constructions differing from the types described above.

While the invention has been illustrated and described as embodied in a module and network manager for an optical communications network, it is not intended to be limited to the details shown, since various modifications and structural changes may be made without departing in any way from the spirit of the present invention.

Without further analysis, from the foregoing others can, by applying current knowledge, readily adapt the present invention for various applications. Such adaptations should and are intended to be comprehended within the meaning and range of equivalence of the following claims.

The invention claimed is:

1. An optoelectronic module for coupling an information system device with an optical fiber comprising:
   a housing including an electrical connector for coupling with an external electrical cable or information system device and for transmitting information-containing electrical signals over said connector, and a fiber optical connector adapted for coupling with an external optic fiber for transmitting an optical signal;
   an electro-optic subassembly disposed in said housing coupled, to the information system device for converting the electrical signals to a modulated optical signal corresponding to the electrical signals at a predetermined wavelength;
   means disposed in said housing for collecting data associated with the module and the operation of the module; and an RFID tag disposed in said housing for storing said collected data at periodic time intervals, and for transmitting a stored unique identifier associated with the module to an external device and transferring said collected data to said external device, when interrogated by said external device.

2. The module of claim 1, wherein said means for collecting data includes parametric data collection means to record the total operating time of the module.

3. The module of claim 2, wherein said parametric data collection means further records the temperature and time rate change of temperature by a sensor disposed in the housing.

4. The module of claim 1, wherein said means for providing an electrical signal provides said unique identification associated with the module.

5. The module of claim 1, wherein said RFID tag is a programmable transponder.

6. The module of claim 1, wherein said RFID tag is a passive RFID tag including an antenna tuned to an interrogating frequency of the external device.

7. The module of claim 1, wherein the RFID tag receives data from the external device for storage in the module.

8. The module of claim 1, wherein the external device is a portable RF terminal.

9. The module of claim 1, further comprising a network management system coupled to said external device for monitoring operation of the module.

10. A portable terminal for communicating with an external optoelectronic module, the optoelectronic module including a first housing including an electrical connector for coupling with an external host device and for transmitting information-containing electrical signals over said connector, and a fiber optical connector adapted for coupling with an external optic fiber for transmitting an optical signal, and an electro-optic subassembly disposed in said first housing coupled to the host device for converting an electrical signal to a modulated optical signal corresponding to the electrical signal at a predetermined wavelength, comprising: a second housing; a wireless communication interface disposed in said second housing for wirelessly communicating with the module; data acquisition means in the second housing for acquiring identification and operational data from the module; and a display device for electronically displaying said acquired identification and operational data, identification of the host device into which the module is plugged in, and identification of the manufacturer of the module.

11. The potable terminal of claim 10, wherein said operational data includes total operating time of the optoelectronic module.

12. The potable terminal of claim 10, wherein said operational data includes the temperature of the first housing.

13. The potable terminal of claim 10, wherein said operational data includes the time rate of change of the temperature of the first housing.

14. In a data communications network including a plurality of network units and a plurality of pluggable optoelectronic modules coupled to one or more of such network units, the modules functioning to couple the associated network unit to an optical fiber for transmitting and/or receiving optical signals over such fiber, each module having a unique electronic identifier that is selectable from a set of identifiers and is utilized by the network to activate such module when the module is plugged into the network unit, a portable terminal comprising:
    a display device for electronically displaying a list of optoelectronic modules plugged into one or more network units and in the vicinity of the portable terminal;
    means for selecting a module from the displayed list of optoelectronic modules;
    a wireless receiver disposed in the terminal for wirelessly receiving data from said selected module including the identifier associated with said selected module and environmental or operational data associated with said selected module; and
    means for processing said data for determining the operational condition of said selected module.

15. The potable terminal of claim 14, wherein said operational data includes total operating time of the optoelectronic module.

16. The potable terminal of claim 14, further comprising an electrical connector for providing power to said pluggable optoelectronic modules when plugged into respective network units.

* * * * *